United States Patent
Reilley (12)

(10) Patent No.: US 7,031,452 B2
(45) Date of Patent: Apr. 18, 2006

(54) AUTOMATIC PHONE DIALER WITH HEURISTIC ALGORITHM

(76) Inventor: Peter V. Reilley, 20 King Arthur Dr., Londonderry, NH (US) 03053

( * ) Notice: Subject to any disclaimer, the term of this patent is extended or adjusted under 35 U.S.C. 154(b) by 58 days.

(21) Appl. No.: 10/921,254

(22) Filed: Aug. 19, 2004

(65) Prior Publication Data

US 2006/0039549 A1   Feb. 23, 2006

(51) Int. Cl.
*H04M 3/00* (2006.01)
(52) U.S. Cl. ............ 379/355.08; 379/355.01; 379/355.02; 379/355.05; 379/356.01
(58) Field of Classification Search ......... 379/355.01, 379/355.02, 355.05, 355.08, 356.01
See application file for complete search history.

(56) References Cited

U.S. PATENT DOCUMENTS

| | | | |
|---|---|---|---|
| 3,341,666 A | | 9/1967 | Wallace |
| 3,932,709 A | | 1/1976 | Hoff |
| 4,011,414 A | | 3/1977 | Warren |
| 6,405,059 B1 | * | 6/2002 | De Crouy-Chanel ... 379/355.08 |
| 6,567,675 B1 | * | 5/2003 | Rosen et al. ........... 379/355.08 |
| 2004/0052355 A1 | * | 3/2004 | Awada et al. .......... 379/355.01 |
| 2004/0136514 A1 | * | 7/2004 | Rambo ................. 379/355.05 |

* cited by examiner

*Primary Examiner*—Jefferey F. Harold

(57) ABSTRACT

A repertory dialer for managing commonly used phone numbers. The system manages memorized phone numbers automatically without direct user intervention. It is particularly useful when the phone company changes area codes. The system can make area code changes transparent to phone users.

16 Claims, 1 Drawing Sheet

AUTOMATIC PHONE DIALER WITH HEURISTIC ALGORITHM

CROSS-REFERENCE TO RELATED APPLICATIONS

Figure 1:
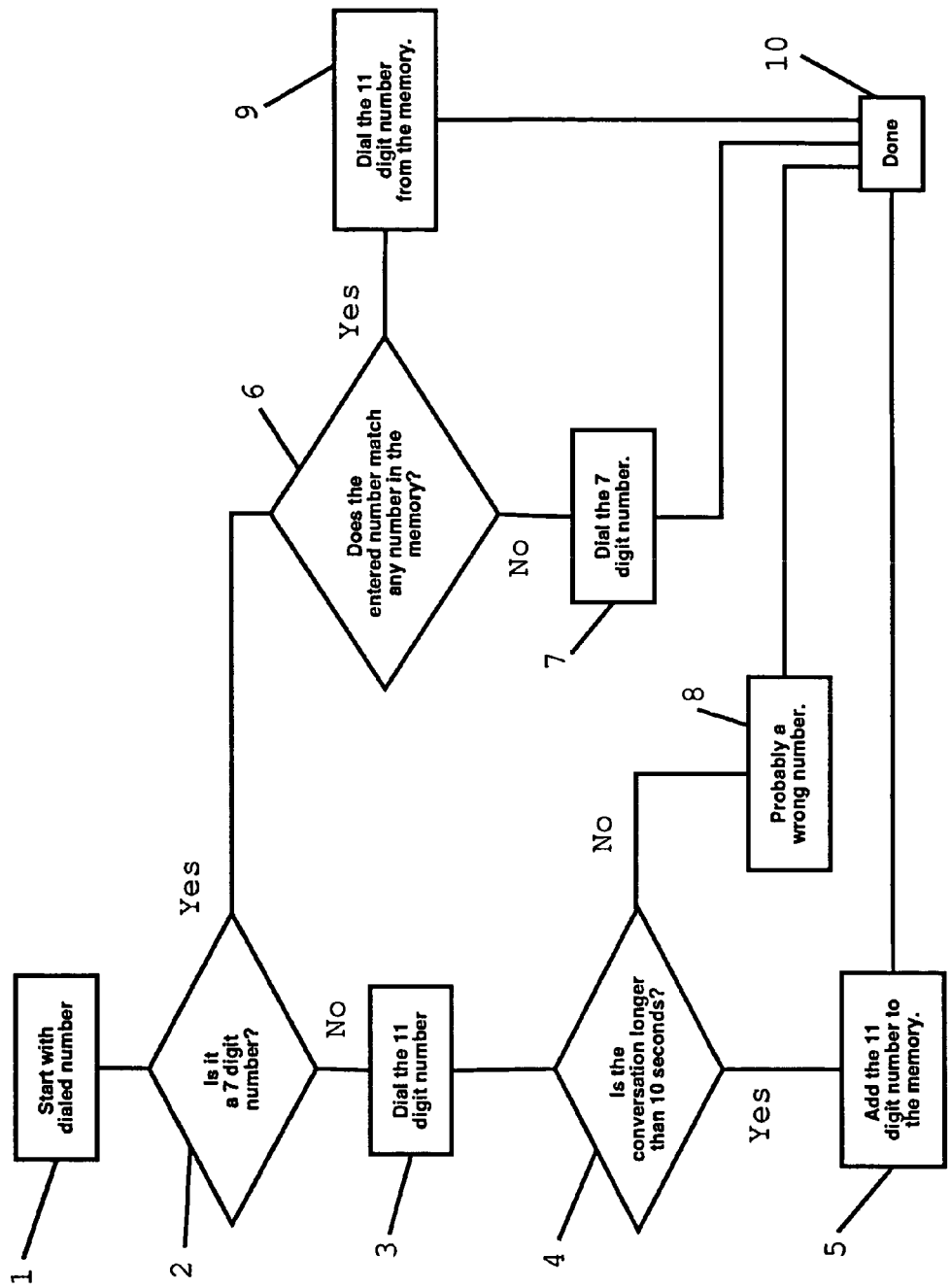

Not Applicable.

FEDERALLY SPONSORED RESEARCH

Not Applicable.

SEQUENCE LISTING OR PROGRAM

Not Applicable.

BACKGROUND OF THE INVENTION

1. Field of Invention

This invention relates to a method of automatically storing and recalling telephone numbers.

2. Prior Art

Today most phones have auto-dialers sometimes called repertory dialers. This feature can be used to store numbers that are later recalled using special buttons. The feature can be implemented in the phone itself or can be implemented in the phone system exchange. Either way, the function is similar.

One of the oldest is U.S. Pat. No. 3,341,666 by Jacob Wallace. He recognized that with the new, at the time, direct long distance dialing people would not like dialing the extra digits to complete a long distance call. His solution was a repertory dialer that used an electronic memory. Earlier units had used some mechanical means of storing phone numbers.

In U.S. Pat. No. 3,932,709 Hoff et al. disclose a repertory dialer that automatically remembers the last number dialed. This is commonly implemented on phones today. It is frequently called "redial" on telephone keypads.

U.S. Pat. No. 4,011,414 by Walter Warren discloses a repertory dialer that uses a processor and memory to perform the dialer function. This eliminates special purpose circuitry.

There are a number of problems with the auto-dialers. The first is that the user has to program it. These systems are complicated and require a manual to learn how to use them. Users frequently misplace the manual making the system difficult or impossible to use. Many people find the system too complex and never use it.

Some phones assign a dedicated key to each stored phone number. These are quite easy to use once programmed. However most phones use an index number to recall the desired phone number from memory. Many phones can save up to 100 phone numbers. Most people cannot remember the 2-digit index needed to recall the desired phone number. Remembering the 2-digit index is made harder since it is not associated with the stored phone number. Most people require a written note to help them remember. These notes can get lost.

In actual use most auto-dialers are less useful than people would like. The present invention solves these problems.

BACKGROUND OF THE INVENTION

3. Objects and Advantages

The present invention solves the problem with existing auto-dialers. The advantages to the present invention are;

(a) You do not have to remember an index number.
(b) There are no special buttons necessary to operate the feature.
(c) It is able to recall a number given only a portion of the that number.
(d) The user does not deliberately program the phone dialer.
(e) The feature does not interfere with normal phone operation.
(f) Very simple logic.
(g) Solves the problem of people being forced to dial 10 or 11 digit numbers.
(h) People can continue to dial the original 7-digit number even when the area codes change.
(i) The number that you dial is associated with the number in memory thereby making it easy to remember.
(j) There is no instruction manual.

The invention combines these features in a way that provides significant advantages over the current phone dialer schemes.

SUMMARY

In accordance with the present invention an automatic auto-dialer is both more useful and simpler to manage. It is able to assist the user when needed but does not interfere when it can't help. It does not require deliberate programming.

DRAWINGS

Figures

FIG. 1 shows a flow chart of the auto-dialer invention.

DRAWINGS

Reference Numerals

1. Starting point of the flow chart. This is where the user-dialed number is received.
2. The number is examined to see if it has 7 digits and a decision is made.
3. If the number is not a 7-digit number then dial the received number. In most circumstances the number will be a 10 or 11-digit number that includes the area code.
4. Time the call once the connection is made. If the call is short them it is likely to be a wrong number. If it is longer than 10 seconds, for example, it is likely to be a valid phone number.
5. This must be a good 10 or 11 digit number that includes the area code. Save this number in one of the memory locations.
6. The received number has 7-digits. Compare this 7-digit number with all the numbers saved in the memory. The comparison is made against only the low 7 digits of the saved numbers.
7. If the 7-digit number does not match any number in the memory then simply dial the 7-digit number. It is probably a local call.
8. If the phone call lasts for only a short time then it is probably a wrong number. We don't want to save bad numbers in the memory.
9. If it matches a number in the memory then dial the full 11-digit number recalled from the memory.
10. Done. We have finished the process.

DETAILED DESCRIPTION

FIG. 1

FIG. 1 shows a flowchart describing the operation of the invention.

Operation

The purpose of the invention is to make the use of telephone dialers easier to use and simpler to manage. For the user that means almost not being aware of the invention's actions. In most cases, when the phone user dials a 7-digit number it goes through normally. When the user needs to make a long distance call he dials the 10 or 11 digit number that he normally would. The system acts normally as the user expects.

A 7-digit number means a local phone call. It is generally of the form XXX-XXXX. Each X representing a digit from 0 to 9. These 7 digits are sufficient to dial a number within the area of the local exchange. An 11 digit number means a long distance phone call. It is of the form 1 (YYY) XXX-XXXX. The first "1" digit indicates a long distance phone call to the phone system. The YYY represents the area code. Each Y represents a digit from 0 to 9. The X portion of the number is the local phone number as described previously. A 10-digit number is the same as the 11 digit number except that the leading "1" is dropped. These numbers are referred to as long numbers and short numbers. Long numbers have 10 or 11 digit numbers. Short numbers have 7 digits.

The user is generally unaware of when the invention has aided his call. When a 7-digit call is made the invention takes the 7-digit number and compares it with all of the saved 11 digit numbers. If a match is found then the 11-digit number is dialed. If a match is not found then the original 7-digit number is dialed. The user need not be aware that this has occurred.

The process of handling phone numbers disclosed by this invention is illustrated by the flow chart shown in FIG. 1. When a person dials a number we are at the start point 1. Next the number of digits in the dialed number is checked 2. If it is a 7-digit number then the number is compared 6 with all the numbers stored in the memory. If the 7 digits match the local exchange portion of one of the numbers stored in the memory then dial 9 the number was found in the memory. If there was no match then dial 7 number that the user entered at the start 1 point. At this point we are done 10 and the process starts again 1.

If the number dialed at the start 1 was not 7 digits then simply dial 3 the received number to the phone system. When the call is established measure the length of the phone call. If the length is longer 4 then some set time such as 10 seconds, enter the number into the memory 5. This is probably a good phone number and the person is likely to want to make the call again. If the phone call is shorter 4 then the set time length the phone call is likely to be a wrong number 8. At this point we are done 10 and the process starts again 1.

This entire process goes on in the background without the user's knowledge. The only time that the user might be aware of the process is when the system dials an 11 digit from memory when he only entered a 7-digit number.

The method described for determining the validity of a phone call is by timing the length of the call. There are other methods possible such as receiving a signal from the receiving phone. It is intended that this patent cover all methods of determining the validity of a phone call.

I claim:
1. A machine for storing, recalling and dialing telephone numbers, comprising:
   (a) an input device where a person may enter a telephone number, and
   (b) a memory device capable of storing multiple telephone numbers, and
   (c) a computer with the ability receive, analyze and send said telephone numbers, and
   (d) a device that is able to dial telephone numbers when instructed to do so by said computer,
   (e) wherein said received telephone numbers may be either long or short in their number of digits, and
   (f) wherein said computer will save said long telephone numbers in one of the memory locations, and
   (g) wherein the computer will search the memory looking for a matching long number when a short telephone number is received from the input device, and
   (h) wherein the computer, upon receiving a short number, will chose the long number from memory if a match found or if no match is found will then choose the received number, and
   (i) wherein the computer will choose the number received from the input device if the received number is not a short number, and
   (j) wherein the computer will send said chosen number to said dialing device, whereby the dialing device will cause the chosen number to dialed to the telephone exchange.

2. The telephone dialer of claim 1 wherein the short phone number is 7 digits in length.

3. The telephone dialer of claim 1 wherein the long phone number is 11 or 10 digits in length.

4. The telephone dialer of claim 1 wherein the long phone number is saved in memory only if the phone number is determined to be valid.

5. The telephone dialer of claim 1 wherein the long phone number is saved in memory only if the phone number is determined to be valid by measuring the length of the phone call.

6. The telephone dialer of claim 1 wherein the short phone number is 7 digits in length and the long phone number is 11 or 10 digits in length.

7. The telephone dialer of claim 6 wherein the long phone number is saved in memory only if the phone number is determined to be valid.

8. The telephone dialer of claim 6 wherein the long phone number is saved in memory only if the phone number is determined to be valid by measuring the length of the phone call.

9. A method of storing, recalling and dialing telephone numbers, comprising:
   (a) a means of receiving a telephone number from a person, and
   (b) a memory means for saving multiple telephone numbers, and
   (c) a processor means capable of receiving, analyzing and sending said telephone numbers, and
   (d) a dialing means capable of dialing a telephone number,
   (e) wherein said received telephone numbers may be either long or short in their number of digits, and
   (f) wherein said processor means will save said long telephone numbers in one of the memory locations and,
   (k) wherein the processor means will search the memory looking for a matching long number when a short telephone number is received from the input device, and (g) wherein the processor will choose the number from memory if the short number matches a subset of one of the numbers in memory, and (h) wherein the processor will choose if the short number if it matches no number in memory, and (i) wherein the processor will choose the received number if it is not a short number, and (j) wherein the processor will send the chosen number to said dialing means, whereby the dialing means will dial the chosen number to the telephone exchange thereby establishing the telephone call.

10. The telephone dialer of claim 9 wherein the short phone number is 7 digits in length.

11. The telephone dialer of claim 9 wherein the long phone number is 11 or 10 digits in length.

12. The telephone dialer of claim 9 wherein the long phone number is saved in memory only if the phone number is determined to be valid.

13. The telephone dialer of claim 9 wherein the long phone number is saved in memory only if the phone number is determined to be valid by measuring the length of the phone call.

14. The telephone dialer of claim 9 wherein the short phone number is 7 digits in length and the long phone number is 11 or 10 digits in length.

15. The telephone dialer of claim 14 wherein the long phone number is saved in memory only if the phone number is determined to be valid.

16. The telephone dialer of claim 14 wherein the long phone number is saved in memory only if the phone number is determined to be valid by measuring the length of the phone call.

* * * * *